United States Patent

Houghton et al.

[11] Patent Number: 5,451,764
[45] Date of Patent: Sep. 19, 1995

[54] APPARATUS AND METHOD FOR STORING AND READING DATA

[75] Inventors: Richard A. Houghton, Cocoa Beach, Fla.; Steven L. Ruzic, Garland, Tex.

[73] Assignee: Texas Instruments Incorporated, Dallas, Tex.

[21] Appl. No.: 54

[22] Filed: Jan. 4, 1993

[51] Int. Cl.⁶ ............................................. G06K 19/06
[52] U.S. Cl. .................................. 235/494; 235/454
[58] Field of Search ............................. 235/454, 494

[56] References Cited

U.S. PATENT DOCUMENTS

| | | |
|---|---|---|
| 3,864,550 | 2/1975 | Cragon . |
| 3,941,979 | 3/1976 | Cragon . |
| 4,286,146 | 8/1981 | Uno et al. ............................ 235/494 |
| 4,439,672 | 3/1984 | Salaman ............................... 235/494 |
| 4,947,383 | 8/1990 | Hudson ................................ 235/494 |
| 4,970,712 | 11/1990 | Tsuruoka ............................. 235/494 |
| 5,073,954 | 12/1991 | Van Tyne ............................ 235/494 |
| 5,126,542 | 6/1992 | Priddy ................................ 235/494 |
| 5,202,552 | 4/1993 | Little et al. ......................... 235/494 |
| 5,204,515 | 4/1993 | Yoshida ............................... 235/494 |

OTHER PUBLICATIONS

David H. Freedman and Roy Friedman, "Bar-Code and Voice Recognition Ease Data-Entry Problems", *Mini-Micro Systems*, Jun. 1983, pp. 239–246.

Steven Bobker, "The Software Stip", *Macuser*, Apr. 1986, pp. 38–43 & 136.

*Primary Examiner*—Harold Pitts
*Attorney, Agent, or Firm*—Dana L. Burton; James C. Kesterson; Richard L. Donaldson

[57] ABSTRACT

An apparatus (38) for storing data includes a storage media (14). Also included are a number of vertical bars (40), each providing a vertical edge (50) for defining columns (44), and a number of horizontal bars (42), each providing a horizontal edge (52) for defining rows (46). The vertical bars (40) and the horizontal bars (42) are printed on storage media (14). A number of data blocks (48) are formed, each data block (48) located in a row (46), column (44) position.

12 Claims, 3 Drawing Sheets

APPARATUS AND METHOD FOR STORING AND READING DATA

TECHNICAL FIELD OF THE INVENTION

This invention relates in general to digital computing systems equipment, and more particularly to an apparatus and method for storing data on a printable media, and a method for reading the data.

BACKGROUND OF THE INVENTION

It is often desirable to distribute binary computer data for a large number of users in a manner that is cost-effective. The equipment and media for transferring the data to the user must be available and affordable. In the past, if a publisher desired to distribute data, such as a computer program, he had few choices. The publisher could provide magnetic media, such as a floppy disk, on which the data was stored. The publisher could also provide the data over an electronic communications network such as the telephone lines. However, floppy disks are expensive. Sending the data over an electronic media, such as telephone lines, is quick and perhaps less expensive, but the user must have the means to receive the data this way. The expense of such means, such as a modem, could be prohibitive to the user.

One approach to mass distribution of data uses paper as the storage media. Binary data is printed on the paper in a specified format or structure. In this way, the data can reach a large number of users, perhaps through a magazine or a newspaper. One of the ways a user can transfer the data from the paper to his computer is to feed the paper through an optical scanner. The scanner scans the data and converts it into electronic signals, useable by a computer.

One of the problems associated with existing paper media is that the particular type of scanner needed, which is of a thermal type, is very expensive.

A second problem is that the printed data format is very sensitive to skewing of the scanning device. That is, the media must be aligned properly, with little or no skewing between the media and the scanning device, in order that the scanner read the data properly.

A third problem is scaling and optical distortion of the printed data. Such distortion may arise when the media is printed or copied. Printed data having these distortions may not be converted into the proper electronic signals after it is scanned.

Therefore, a need has arisen for an improved apparatus and method of storing printed data, wherein data may be transferred into a computer with a device whose cost is not prohibitive. In addition, the apparatus and method must be tolerant of skewing problems associated with the alignment of the scanner relative to the physical layout of the storage format, as well as of distortions of the printed data incurred during printing or copying of the printed media.

SUMMARY OF THE INVENTION

In accordance with the present invention, an apparatus for storing data is provided. This apparatus includes a storage media. A number of vertical bars are printed on the storage media. Each vertical bar provides a vertical edge for defining columns. A number of horizontal bars are also printed on the storage media. Each horizontal bar provides a horizontal edge for defining rows. Additionally, a number of data blocks are printed on the storage media. The data blocks represent at least one bit of binary data, with a data block being located at each row/column position.

In an other aspect of the invention, each of the data blocks has a known horizontal distance from an associated vertical edge and a known vertical distance from an associated horizontal edge.

In yet another aspect of the invention, each data block includes more than one data unit, where each data unit represents a bit of binary data.

A first technical advantage of the invention is that it provides a cost effective way to store data.

A second technical advantage of the invention is that it provides a cost effective way to transfer the data to a large number of users.

A third technical advantage of the invention is that the stored data can be scanned by a number of widely available and affordable devices.

A fourth technical advantage of the invention is that the data can be interpreted by a number of widely available and affordable devices.

A fifth technical advantage of the invention is that stored data can be properly interpreted when the media is skewed with respect to the scanning device.

A sixth technical advantage of the invention is that the stored data can be interpreted when the data, horizontal bars or vertical bars printed on the media are distorted from the printing process or copying.

BRIEF DESCRIPTION OF THE DRAWINGS

For a more complete understanding of the present invention, and the advantages thereof reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
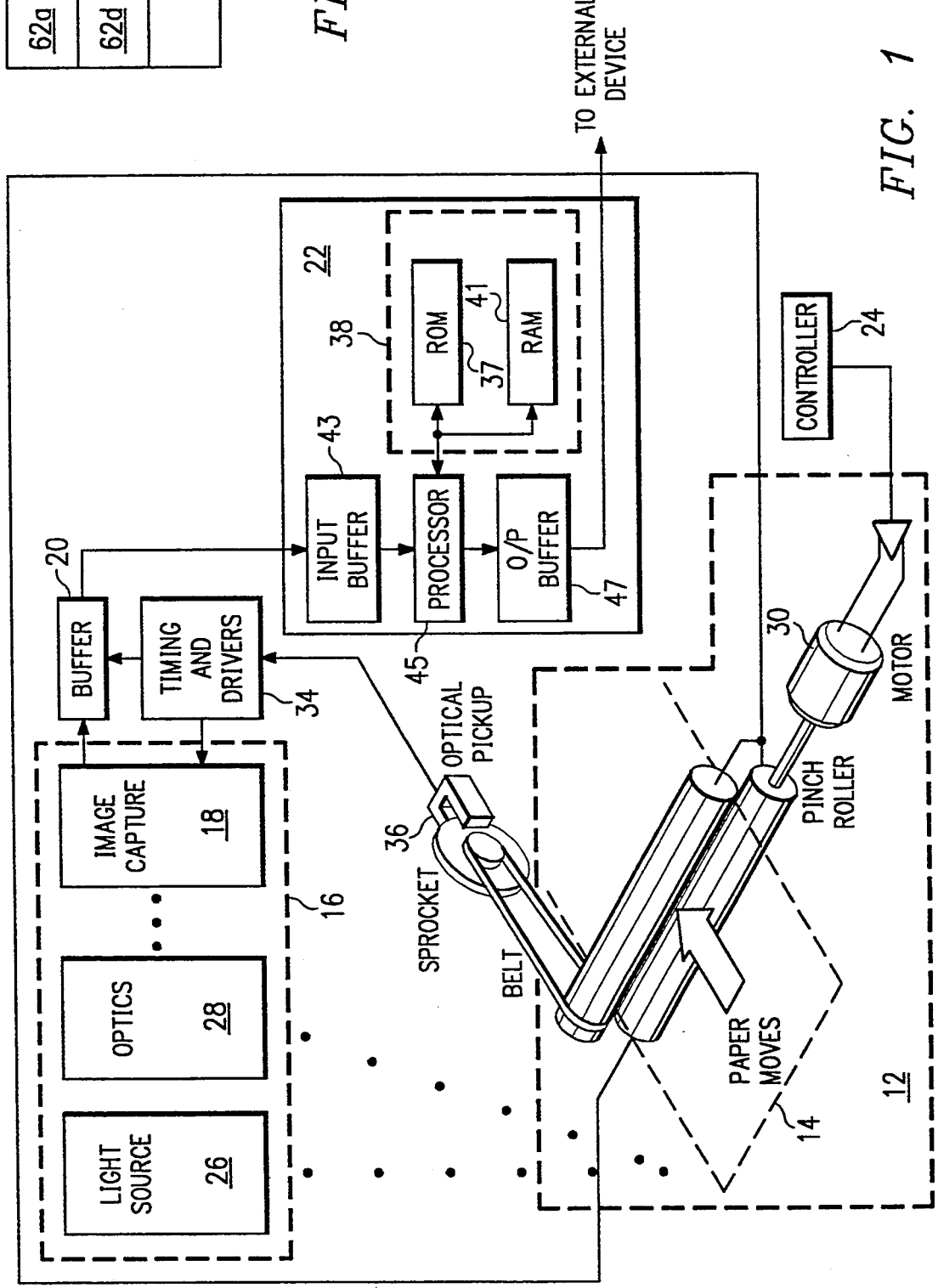
FIG. 1 is a device for scanning and interpreting data printed on a printed storage media.

FIG. 1 depicts a data scanning device 10 constructed in accordance with the invention. A pinch bar roller assembly 12 moves a printed storage media 14 into a position for scanning by scanning assembly 16. Scanning assembly 16 includes a light source 26 which emits light which is reflected from the surface of media 14. In the embodiment of this description, light source 26 may comprise, for example, a light emitting diode (LED) array. This reflected light is focused by optics 28 onto image capture device 18, which converts this light into electrical signals. In the embodiment of this invention, image capture device 18 may comprise, for example, a charge coupled device (CCD). These electronic signals are transported via buffer 20 to an interpreter 22. Interpreter 22 interprets the data and converts it into a computer-readable format. The structure and operation of buffer 20 and interpreter 22 are explained in detail below.

Image capture device 18 scans one line of its pixel elements at a time. Controller 24 maintains a proper rotational speed of roller motor 30, thereby allowing image capture device 18 adequate time to scan each line. Timer 34 receives a signal from optical pickup 36 every time roller assembly 12 moves media 14 one line. Timer 34 relays this information via a clock signal to inform image capture device 18 to begin scanning the new line. Timer 34 clocks the electronic signals or pixels from image capture device 18 into and out of buffer 20. Furthermore, timer 34 clocks the pixel data from buffer 20 into memory 38 of interpreter 22. This pixel data is stored by input buffer 43 until interpreter 22 converts it into useable binary data. The binary data may also be stored in memory 38 until needed.

Figure 2:
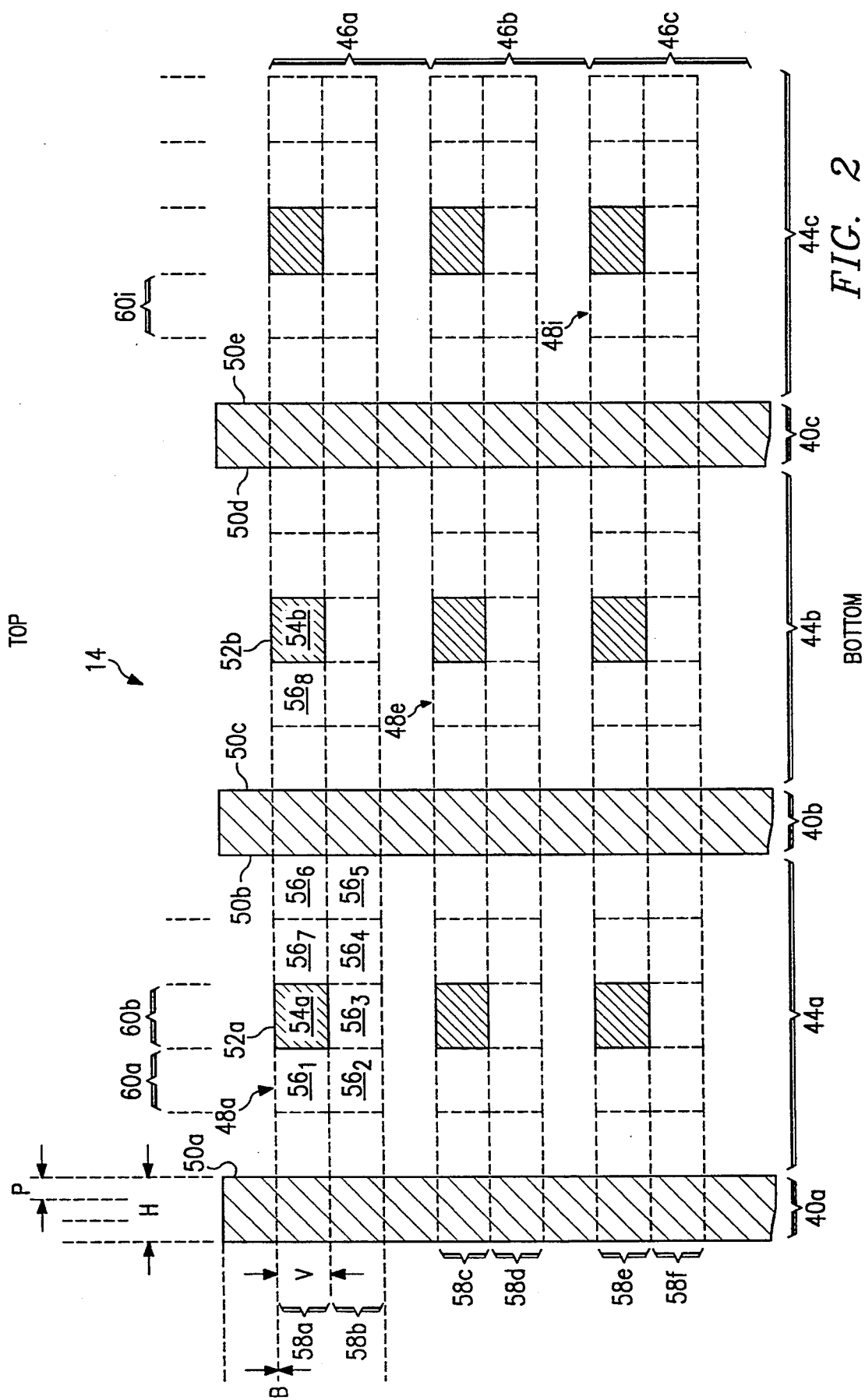
FIG. 2 illustrates a portion of the printable storage media of FIG. 1 with its registration bars and data block format.

FIG. 2 shows a portion of a storage media 14 in "blank" form, i.e., without printed data, but with an outline of data unit positions in which data can be printed. The dashed lines are for clarification and explanation only, and are not actually printed on storage media 14.

Only three rows 46 and columns 44 are shown. A typical media 14 would have many more rows 46 and columns 44 printed on it. Typically, media 14 is a long strip with more rows 46 than columns 44, with the total column width being compatible with the linear reading capacity of scanning assembly 16.

In one embodiment, storage media 14 is paper. However, media 14 could be any other type of media having a printable surface. Storage media 14 has printed upon it vertical registration bars 40 and horizontal registration bars 54. These registration bars 40 and 54 define row/column positions.

At each row/column position is an area in which a data block 48 may be printed, as indicated by dotted lines. More specifically, each data block 48 is within an area whose boundaries are a consecutive pair of vertical edges 50 and a consecutive pair of horizontal edges 52. In this embodiment, media 14 is scanned from top to bottom and from left to right, where horizontal edges 52 and vertical edges 50 are leading and trailing edges of their respective registration bars 54 and 40.

Each data block 48 includes a number of data units 56. Data units 56 are aligned horizontally into horizontal channels 58. Data units 56 are also vertically aligned into vertical channels 60. In this embodiment, there are four vertical channels 60 per column 44, and two horizontal channels 58 per row 46. Each data block 48 is shown to include seven data units 56. However, other embodiments may have fewer data units 56 per data block 48. For example, data units $56_1$, $56_6$, and $56_7$, and all other data units 56 equivalently located in other data blocks 48 could be removed, so that only one of the two horizontal channels 58 per data block 48 contain data units 56. Further, some data units 56 in the remaining horizontal channel 58 could be removed. This would result in less than four data units 56 per data block 48. In fact, any combination of data units 56 may be removed, as long as this information is present in the memory of interpreter 22. In another embodiment, if either data unit $56_1$ or $56_7$ and its equivalents are removed, horizontal registration bars 54 can be extended by an area of one data unit 56 on either or both sides.

Figure 4:
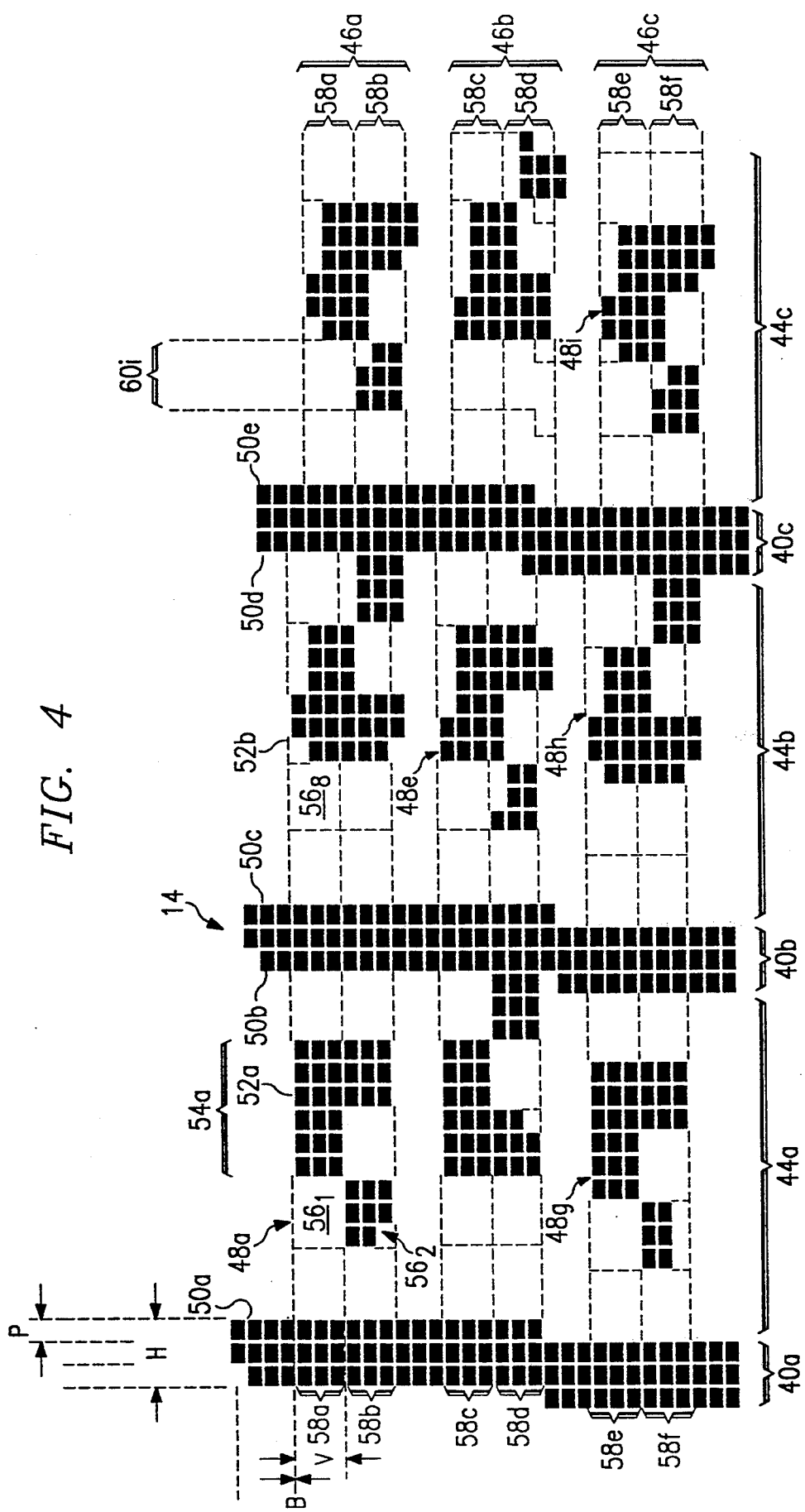
FIG. 4 is a pixel map of the printed storage media when it is skewed with respect to the scanning and interpreting device of FIG. 1.

An embodiment where the right portion of horizontal segments 54 occupy former data unit $56_7$ and equivalents is shown in FIG. 4. In general, data units 56 are contained in a horizontal channel, such as horizontal channel $58_a$, on either side of a horizontal registration bar 54, or in the next horizontal channel, such as $58_b$, below a horizontal registration bar 54. Also, in each row/column position, there is a space between its associated vertical registration bar 40 and data block 48, and a space between data block 48 and the next horizontal registration bar 54. As explained below, these spaces insure black to white transitions when locating edges 50 and 52.

There is a vertical distance of V between each horizontal edge 52 and the next horizontal channel 58 of data units 56. Also, there is a horizontal distance, H, between each vertical edge 50 and the next vertical channel 60 of data units 56. In other embodiments, these distances may be different, and this difference will not change the operation of the scanning and interpreting device 10.

Figure 3:
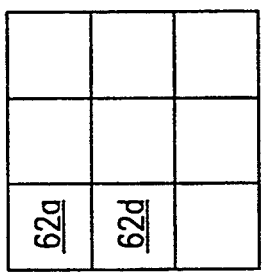
FIG. 3 is a view of the relationship between a data unit of FIG. 2 and the pixel elements of a scanning unit.

Referring to FIG. 3, each data unit 56 is scanned as or subdivided into a number of pixels 62, here nine, by the scanning action of image capture device 18. The pixel size corresponds to the size of each scanning element of image capture device 18. The number of pixels depends upon the number of scanning elements in image capture device 18. That is, the number of pixels depends upon the resolving power, or resolution, of image capture device 18.

Referring to FIG. 4, which is discussed more fully below, one can see that vertical bars 40 and horizontal bars 54, which are of widths H and V respectively, are subdivided by the image capture device 18 scanning action into a number of pixels as well. In this embodiment, pixel dimensions P are one third of H and V, or 1/300 of an inch, for each side. This three to one ratio of pixels 62 to minimum widths H and V is sufficient to accommodate the resolution of image capture device 18.

Because image capture device 18 scans one line of pixels 62 at a time, it scans three lines of pixels to read one data unit 56. Interpreter 22 uses a program stored in read only memory (ROM) 37 of memory 38 to convert these pixels 62 into binary data after they are scanned. Pixel data from buffer 20 is fed into input buffer 43 and temporarily stored there. Processor 45 then converts this pixel data "on the fly" into binary form, and transmits it to random access memory (RAM) 41 for storage. Input buffer 43 contains enough buffer space to store one scan line of pixel data, with allowance for skewing.

At an indefinite time later, processor 45 can retrieve the binary data from RAM 41 and transmit it to output buffer 47. Output buffer 47 temporarily stores the binary data until it is retrieved by an external device.

In this embodiment, the media 14 is scanned from the top to the bottom of and from the left to the right of the media 14 shown in FIG. 2. Interpreter 22 first locates vertical edge $50_a$ by noting the change of color from dark to light pixels 62 as the image capture device 18 scans from vertical bar $40_a$ past edge $50_a$. Interpreter 22 then locates horizontal edge $52_a$. It does this by noting the change in pixel color from light to dark as image capture device 18 scans the first line of pixels 62 in horizontal segment $54_a$.

Interpreter 22 uses horizontal edge $52_a$ and vertical edge $50_a$ to locate the position of any data unit 56 within data block $48_a$. Interpreter 22 has been programmed with the distance, in pixels, that each data unit 56 is located from the corresponding horizontal edge 52 and vertical edge 50 which define the boundaries of the data block 48 containing the data unit 56 in question. For example, interpreter 22 counts three pixels from horizontal edge $52_a$ and three pixels from vertical edge $50_a$ to locate the top and left edges respectively of data unit $56_2$.

Interpreter 22 determines the color or shade of each of the nine pixels contained within data bit $56_2$, and then determines the value (logic 1 or logic 0) of data bit $56_2$. In this embodiment, a dark or black color corresponds to a logic one, whereas a light or white color corresponds to a logic zero. However, one can see that black could be interpreted as a logic zero, and white a logic one, without any change in the fundamental operation of the invention.

Ideally, each of the nine pixels 62 which form a data unit 56 will all be of the same color, the color depending upon the value of the data unit 56. Occasionally, the nine pixels 62 will not be of the same color. This nonuniformity in color can be caused by imperfections in the equipment or process used in printing media 14.

For example, suppose data unit $56_3$ was to be a white or blank color to represent a logic zero. However, black coloring, or ink, from the last row of pixels 62 in horizontal segment $54_a$ flowed into the first row of pixels 62 in data unit $56_3$, making them black. Data unit $56_3$ would now be comprised of six white pixels and three black pixels. Interpreter 22 implements an algorithm which determines that in this case, data unit $56_3$ is indeed white, and not black. The algorithm gives various weights of probability to each pixel, corresponding to how likely or unlikely it is that the pixel will have an erroneous color. For example, pixels in the center of a data unit 56 have a lower probability of error than pixels along the edge of the same data unit 56.

Interpreter 22 repeats this locating and determining process for each data unit 56 in data block $48_a$, and then converts these data units 56 into a readable, useable or otherwise useful form such as binary data. This binary can represent a text file, a computer program or other information. Interpreter 22 then moves on to the next data block $48_b$, and continues until all data blocks 48 in row $46_a$ are read. Interpreter 22 then interprets the first data block $48_a$ in row $46_b$ and continues on in a like manner until all data blocks 48 are read.

FIG. 4 is a pixel map of a scanned printed storage media 14 generated by interpreter 22 when media 14 is skewed approximately three degrees clockwise with respect to scanning assembly 16. FIG. 4 also illustrates how the scanning action of image capture device 18 divides the components of storage structure 38 into a collection of black and white pixels 62. As in FIG. 2, the dashed lines are drawn for clarity only. Such dashed lines are not part of the pixel map generated by interpreter 24. Also, horizontal bar segments 54 are extended to include the area occupied by data unit $56_7$ and corresponding data units 56 in FIG. 2.

As a result of the media 14 being skewed, data blocks $48_{g-i}$ are shifted to the left by one pixel in the pixel map. The last row of pixels in the portion of horizontal data channel $58_d$ within column $44_c$ is also shifted to the left by one pixel. The portion of horizontal rows $46_{a-c}$ within column $44_c$ is shifted down by one pixel. However, the corresponding portions of vertical edges 50 and horizontal edges 52 are shifted in the same respective directions by one pixel as well. Therefore, each pixel 62 within data units 56 remains a constant perpendicular horizontal and vertical distance from a corresponding horizontal edge 52 and vertical edge 50 respectively. Thus, this skew of media 14 does not prevent interpreter 22 from performing the locating and determining process as defined above.

Although the present invention and its advantages have been described in detail, it should be understood that various changes, substitutions and alterations can be made therein without departing from the spirit and scope of the invention as defined by the appended claims.

What is claimed is:

1. Apparatus for storing data, comprising:
   a storage media having a printable surface on which data is to be stored;
   a plurality of horizontally spaced, vertical registration bars, each having a width, the surface of said storage media, each of said vertical registration bars providing a vertical edge defining a boundary of a corresponding column so as to provide a plurality of columns;
   a plurality of vertically spaced, horizontal registration bars, each having a width, printed on the surface of said storage media, each of said horizontal registration bars being defined by a plurality of separate horizontal sectors arranged in alignment with each other and respectively disposed within a different column of said plurality of columns, each of said horizontal registration bars providing a horizontal edge defining a boundary of a corresponding row so as to provide a plurality of rows said vertical and horizontal bars being non-intersecting; and
   a plurality of data blocks on the surface of said storage media, each of said data blocks being disposed within an area on the surface of said storage media at a respective row/column position;
   each data block being representative of at least one bit of binary data said bit of binary data being printed to represent to represent one of "1" and "0", or being blank to represent the other of "1" and "0".

2. The apparatus of claim 1, wherein each of said data blocks has a known horizontal distance from an associated vertical edge and a known vertical distance from an associated horizontal edge.

3. The apparatus of claim 1, wherein each data block has a plurality of data units, each data unit representing a bit of binary data.

4. The apparatus of claim 1 and further comprising an optical scanner with a prescribed resolving ability wherein dimensions of each of said plurality of vertical bars, horizontal bars and data bits is larger than said prescribed resolving ability of said optical scanner.

5. The apparatus of claim 4, wherein said dimensions are at least three times said prescribed resolving ability.

6. The apparatus of claim 3, wherein said each data unit comprises a plurality of pixels respectively representing regions of said data unit, each of said pixels having a pixel value of either "1" or "0" wherein any printed pixels are representative of one of "1" and "0" and any blank pixels are representative of the other of "1" and "0".

7. The apparatus of claim 1, wherein each data block is at least partially positioned in a first horizontal channel located below a horizontal bar.

8. The apparatus of claim 1, wherein each data block is positioned in a first horizontal channel located below a horizontal bar and a second horizontal channel including said horizontal bar.

9. The apparatus of claim 1 wherein said storage media is paper.

10. The apparatus of claim 1, wherein each of said plurality of vertical bars is parallel to every other of said plurality of vertical bars, and each of said plurality of horizontal bars is parallel to every other of said plurality of horizontal bars.

11. The apparatus of claim 1 wherein the printable surface of said storage media is scanned by a scanner system comprising:

a scanner for scanning the printable surface of said storage media and converting said plurality of data blocks into pixel data from a plurality of pixels respectively representing regions of each data block, each of said pixels having a pixel data value of either "1" or "0" wherein any printed pixels are representative of one of "1" and "0" and any blank pixels are representative of the other of "1" and "0"; and an interpreter for converting said pixel data to said at least one bit of binary data for each of said plurality of data blocks.

12. The apparatus of claim 11 wherein said interpreter further comprises:

a processor for executing instructions for converting said pixel data to said at least one bit of binary data; and a program memory programmed for instructing said processor to locate a vertical edge of a column, locate a horizontal edge of a row, and locate a data block a predetermined vertical distance from said horizontal edge and a predetermined horizontal distance from said vertical edge.

* * * * *